United States Patent
Glotzbach et al.

(10) Patent No.: US 7,707,459 B2
(45) Date of Patent: Apr. 27, 2010

(54) EMBEDDED SYSTEMS DEBUGGING

(75) Inventors: Mark Eugene Glotzbach, Granger, IN (US); Matthew Peter Ebrom, Holland, MI (US); Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 418 days.

(21) Appl. No.: 11/683,697

(22) Filed: Mar. 8, 2007

(65) Prior Publication Data

US 2008/0222612 A1 Sep. 11, 2008

(51) Int. Cl.
*G06F 11/00* (2006.01)
(52) U.S. Cl. ............................... 714/38; 714/39; 714/45
(58) Field of Classification Search .................... 714/38, 714/39, 45
See application file for complete search history.

(56) References Cited

U.S. PATENT DOCUMENTS

| | | | |
|---|---|---|---|
| 5,265,254 A | 11/1993 | Blasciak et al. | |
| 5,295,260 A | 3/1994 | Pribnow | |
| 5,450,586 A | 9/1995 | Kuzara et al. | |
| 5,544,311 A | 8/1996 | Harenberg et al. | |
| 5,640,542 A | 6/1997 | Whitsel et al. | |
| 5,737,516 A | 4/1998 | Circello et al. | |
| 5,754,759 A | 5/1998 | Clarke et al. | |
| 5,964,893 A | 10/1999 | Circello et al. | |
| 6,026,501 A | 2/2000 | Hohl et al. | |
| 6,035,422 A | 3/2000 | Hohl et al. | |
| 6,044,305 A | 3/2000 | Larson et al. | |
| 6,094,729 A | 7/2000 | Mann | |
| 6,134,676 A | 10/2000 | Vanhuben et al. | |
| 6,151,567 A | 11/2000 | Ames et al. | |
| 6,154,856 A | 11/2000 | Madduri et al. | |
| 6,175,914 B1 | 1/2001 | Mann | |
| 6,189,140 B1 | 2/2001 | Madduri | |
| 6,266,716 B1 | 7/2001 | Wilson et al. | |
| 6,269,412 B1 | 7/2001 | Liu et al. | |
| 6,285,966 B1 | 9/2001 | Brown et al. | |
| 6,321,331 B1 | 11/2001 | Roy et al. | |
| 6,469,714 B2 | 10/2002 | Buxton et al. | |
| 6,502,209 B1 | 12/2002 | Bengtsson et al. | |
| 6,618,775 B1 * | 9/2003 | Davis | 710/100 |
| 6,704,803 B2 | 3/2004 | Wilson et al. | |
| 6,704,804 B1 | 3/2004 | Wilson et al. | |
| 6,742,136 B2 | 5/2004 | Christensen et al. | |
| 6,769,076 B1 * | 7/2004 | Moyer et al. | 714/30 |

(Continued)

FOREIGN PATENT DOCUMENTS

EP 0992904 A2 4/2000

(Continued)

*Primary Examiner*—Emerson C Puente
(74) *Attorney, Agent, or Firm*—Robert A. Bacon; McGarry Bair P.C.

(57) ABSTRACT

The invention relates to a data processing system comprising a central processing unit, a first memory coupled to the central processing unit for storing variable data values, an eventing engine coupled to the central processing unit and the memory to monitor in real-time at least one of the variable data values and determine the occurrence of an event based on the at least one of the variable data values, and a debug module coupled to the central processing unit and to the eventing engine for receiving the at least one of the variable data values in real time to conduct a real-time debugging of the program.

21 Claims, 2 Drawing Sheets

U.S. PATENT DOCUMENTS

| | | |
|---|---|---|
| 6,883,065 B1 | 4/2005 | Pittelkow et al. |
| 6,948,098 B2 | 9/2005 | Pillay et al. |
| 6,996,741 B1 | 2/2006 | Pittelkow et al. |
| 7,003,688 B1 | 2/2006 | Pittelkow et al. |
| 7,007,205 B1 * | 2/2006 | Yeager et al. ............... 714/45 |
| 7,043,663 B1 | 5/2006 | Pittelkow et al. |
| 7,043,718 B1 | 5/2006 | Au et al. |
| 7,047,443 B2 | 5/2006 | Kudo et al. |
| 7,069,468 B1 | 6/2006 | Olson et al. |
| 7,100,086 B1 | 8/2006 | Kudo et al. |
| 7,127,633 B1 | 10/2006 | Olson et al. |
| 2002/0174415 A1 | 11/2002 | Hines |
| 2004/0250164 A1 | 12/2004 | Ahmad et al. |
| 2005/0044452 A1 | 2/2005 | Suzuki et al. |
| 2005/0223296 A1 * | 10/2005 | Usui ........................ 714/39 |
| 2006/0092861 A1 | 5/2006 | Corday et al. |
| 2006/0150007 A1 | 7/2006 | Gostynski et al. |
| 2006/0156290 A1 * | 7/2006 | Johnson et al. ............ 717/127 |
| 2006/0168159 A1 | 7/2006 | Weisman et al. |

FOREIGN PATENT DOCUMENTS

| | | |
|---|---|---|
| EP | 1209567 A1 | 5/2002 |
| WO | 03/034225 A2 | 4/2003 |
| WO | 2005/013053 A2 | 2/2005 |

\* cited by examiner

EMBEDDED SYSTEMS DEBUGGING

BACKGROUND OF THE INVENTION

1. Field of the Invention

The invention relates to debugging a program in real-time.

2. Description of the Related Art

Debugging and development tools for locating and eliminating defects, or bugs, in programs for data processing systems are well known. In the past, debugging tools were able to monitor an associated memory as a program was operating normally, which is referred to as "real-time" debugging. Real-time debugging enables data variable watching during program execution in order to determine whether or not the program is working properly.

Initially, a debug program was executed on the main board of the computer. As both programs and processing systems have increased in speed and complexity, the large increase in data and variables to watch during a debug operation exceeded the processing power of the processor and/or the output of the data bus to permit real-time debugging from software running on the computer. In response, the monitoring of data variables has been limited to obtaining variable updates only when the code is not running or intentionally stopped. Debugging tools typically accomplish this using breakpoints, which halt program execution upon the occurrence of specific events. Data variables generated by the program can then be examined at the breakpoint. This poses a problem, as the program can behave differently when it is halted than it would during normal operation. In addition, this creates severe limitations on debugging abilities, as data variables are not examined between breakpoints.

When real-time debugging is necessary, relatively expensive external hardware is used. The external debugging device has sufficient processor speed and a fast enough data bus to effect the real-time debugging. Many families of processors do not have the ability to provide real-time variable monitoring or debugging. There is, therefore, a need for the ability to debug complex programs in real-time using only standard debugging software and the data processing system itself.

SUMMARY OF THE INVENTION

The invention relates to a data processing system comprising a central processing unit for executing instructions to implement an event-based program, a first memory coupled to the central processing unit for storing variable data values generated by the instructions for variables of the program, an eventing engine coupled to the central processing unit and the memory to monitor in real-time at least one of the variable data values and determine the occurrence of an event based on the at least one of the variable data values, and a debug module coupled to the central processing unit and to the eventing engine for receiving the at least one of variable data values in real time to conduct a real-time debugging of the program.

DESCRIPTION OF AN EMBODIMENT OF THE INVENTION

Figure 1:
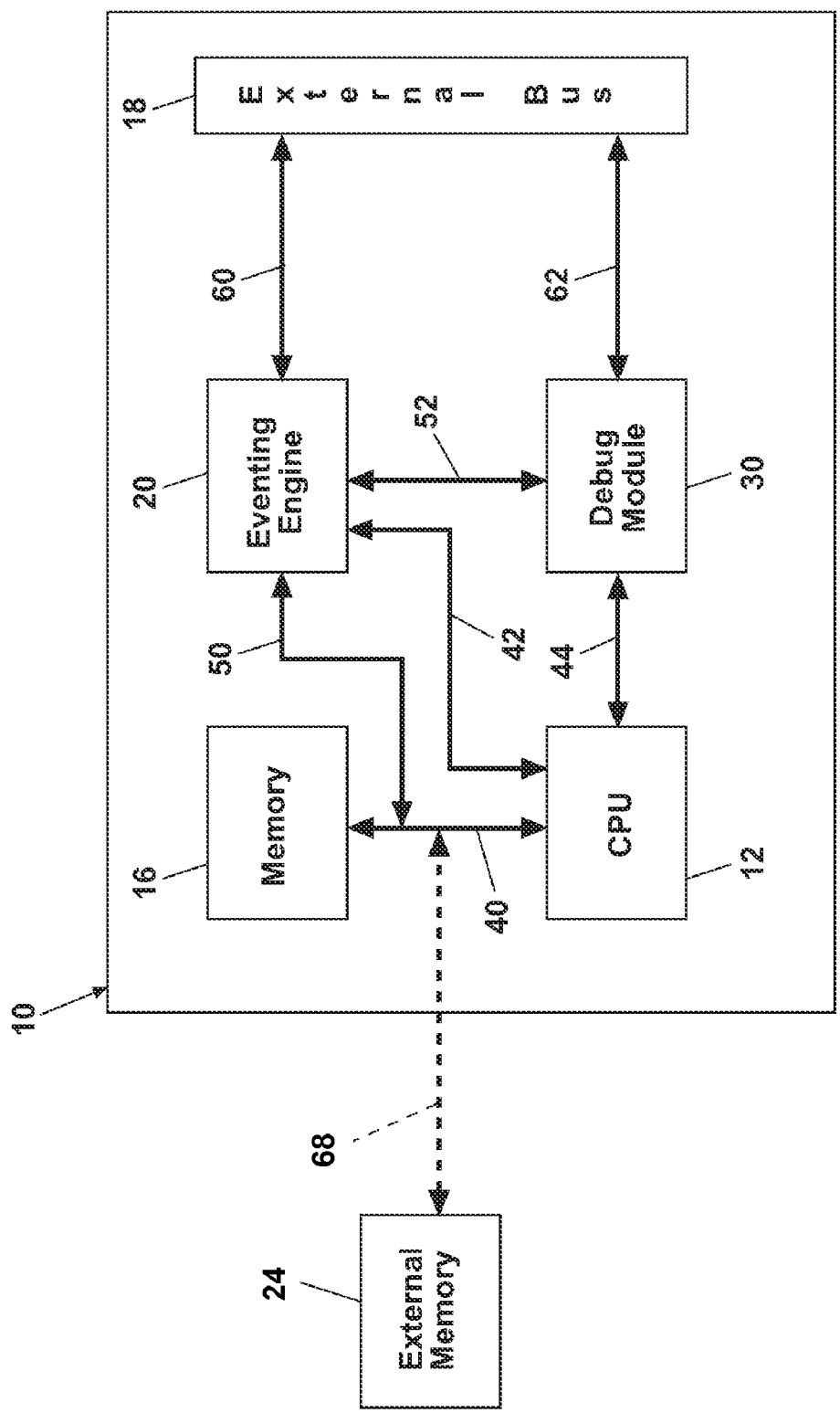
FIG. 1 is a schematic illustration of a data processing system having an eventing engine according to the invention.

The invention provides a way of obtaining real time variable updates in a configurable manner to enable real-time debugging of a data processing system. The invention accomplishes this by using an eventing engine of an event based software application to watch for the occurrence of predetermined events, which drives the event handler of the software to call the appropriate function for handling the event. A message signifying the occurrence of an event can then be sent to at least one other component within the data processing system. The determination of an event is accomplished by monitoring the values of the variables of the program and determining if the variables indicate the presence of an event. These variables can be the same variables whose values would be monitored as part of a debug operation. The data processing system can be one as would be used in any of a number of electronic devices, such as an automobile, a PC, a household appliance, or any other device that uses a computer.

A device incorporating the invention will typically comprise one or more components which perform the operations of the device. By employing a software architecture that enables facile communication between internal components of a device and/or between an external component and one or more of the internal components of the appliance, various components can communicate with the device to expand the capability, functionality, and usability of the device.

The event-based software architecture can be any program with or without the corresponding hardware where the flow of the program is determined by user actions or messages within the program or from other programs. A suitable event-based software architecture is disclosed in the parent Application No. US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, and incorporated herein by reference in its entirety.

In this particular example of software architecture ("SA"), the SA is implemented on and communicates over an internal communications network on an appliance, which connects the various physical components of the appliance.

Some of the physical components have a corresponding controller (main controller, motor controller, user interface, etc.), which may be a simple microprocessor mounted on a printed circuit board. Other components have no controller. Typically the components that have controllers (and if there are more than one are typically also network enabled) cooperate through network messaging or other forms of data transmission to directly or indirectly, through other components, control the operation of all of the components and their contained or attached devices to implement an operation or cycle for the appliance.

The SA can, but does not have to, reside on each of the components with a controller. Those components with the SA or a variant of the SA compliant with the SA (compliance determined by the ability to send, receive, and process packets) form a node on the network that can communicate with the other nodes.

The SA performs multiple functions: identifying each of the components corresponding to a node to the network; identifying the capabilities or functions of the identified components to the network; identifying the status of the components to the network; providing well defined command interfaces for each component; providing communication between internal and external software components that are not part of the SA; and providing communication between components non-SA software components on different physical components. In this way, the SA functions to inform all of the nodes on the network of the presence, capabilities, and status of the other nodes.

The SA comprises multiple modules, each of which has different functionality. Various combinations of the modules or all of the modules can reside on each of the components. One module having the basic or core functionality for the invention resides on all of the components. In one anticipated configuration, all of the modules reside at least on the main controller, which establishes the main controller to function as a primary or controller SA, with the other nodes functioning in a client relationship to the controller SA. In such a configuration, all of the nodes would communicate through the Controller SA.

The SA is sufficiently robust that it can permit configurations without a Controller SA or with multiple Controller SA. Regardless of the configuration, any component with a residing SA can function as a client with respect to the other components.

The internal communications can be connected to one or more external components directly or through an external network. The external components would also have one, some, or all of the SA modules in resident.

All of the communications between internal and external components and/or any combination of components described in this application can be implemented by the software and network structures disclosed in this application.

The software architecture is preferably configured to generate a plurality of messages, with at least one of the software elements residing in each of the components and configured to enable transmission of at least one of the plurality of messages between the components. The messages can be transmitted for bi-directional communication between components. The messages can include command messages. The command messages can include event messages, which indicate that an event has happened that could require the calling of a particular function or module of the software in response to the event.

FIG. 1 illustrates a data processing system 10 according to the invention and which can be implemented within a network as previously described or as a stand-alone device. The data processing system 10 can have any number of elements common to a data processing system 10, and will not be described in detail except as necessary for a complete understanding of the invention. The data processing system 10 includes a central processing unit, referred to herein as a CPU 12, a memory 16, and an external bus 18. The data processing system 10 can also be configured such that an external memory 24 can be connected thereto. The external memory 24 can be any type of common external memory, such as a USB device or a flash memory. The data processing system 10 further includes an eventing engine 20 and a debug module 30.

The various components of the data processing system 10 are interconnected by a plurality of buses enabling data communication therebetween. An example of a data processing system 10 is a main controller or motherboard. All messages sent within the system preferably have the same format. Each bus provides either unidirectional or bidirectional data communication. The CPU 12 is coupled to the memory 16 by a main communication bus 40, which can comprise both a data bus and an address bus to transmit the value for a corresponding memory location. The CPU 12 is also coupled to the eventing engine 20 by a CPU event notification bus 42, and to the debug module 30 by a CPU debug bus 44. The eventing engine 20 is coupled to the main communication bus 40 by an event monitoring bus 50 and to the debug module 30 by a debug event notification bus 52. The eventing engine 20 and the debug module 30 are coupled to an external bus 18 by an event bus 60 and a debug bus 62, respectively. The external bus 18 is configured for connection to any number of external devices (not shown), such as through a serial port, an Ethernet port, a JTAG interface, or the like. The external memory 20 is coupled to the main communication bus 50 by external memory bus 68.

The CPU 12 can execute various instructions to implement an event-based program. The instructions generate various variable data values for a plurality of variables associated with the program. These variable data values of the variables are stored in, or written to, the memory 16. They can also be stored in the external memory 24, which can serve as a backup copy of the memory 16. The main communication bus 40 enables the CPU 12 to read data from and write data to the memory 16. The external memory bus 68 is coupled to the main communication bus 40 so that the CPU 12 can write variable data values to the external memory 24 at the same time as it writes the variable data values to the memory 16.

The debug module 30 is used to communicate data across the debug bus 62 with the external bus 18. An external device connected thereto can interface with the debug module 30 for debugging purposes. Suitable debugging interfaces include, but are not limited to, current JTAG and BDM standards. Alternatively, a suitable debugging interface can be constructed as part of the external bus 18.

The event monitoring bus 50 is configured to enable the eventing engine 20 to read data directly from the main communication bus 40. In other words, the eventing engine 20 can "inspect" all data passing through the main communication bus 40. During this inspection, the eventing engine looks for variable data values of interest. Typically, the evening engine will look for a change in a variable data value. One manner of doing so is to look for a write command from the CPU that changes the variable data value of a specific variable in the memory 16. A change in a variable data value might represent an event to which the event-based program will respond with a call to the proper function or subroutine. If true and the change does represent an event, the eventing engine 20 can send a message to the CPU 12 and/or the debug module 30 via CPU event notification bus 42 and/or debug event notification bus 52 respectively. These messages can be broadcast simultaneously to both the CPU 12 and the debug module 30.

Figure 2:
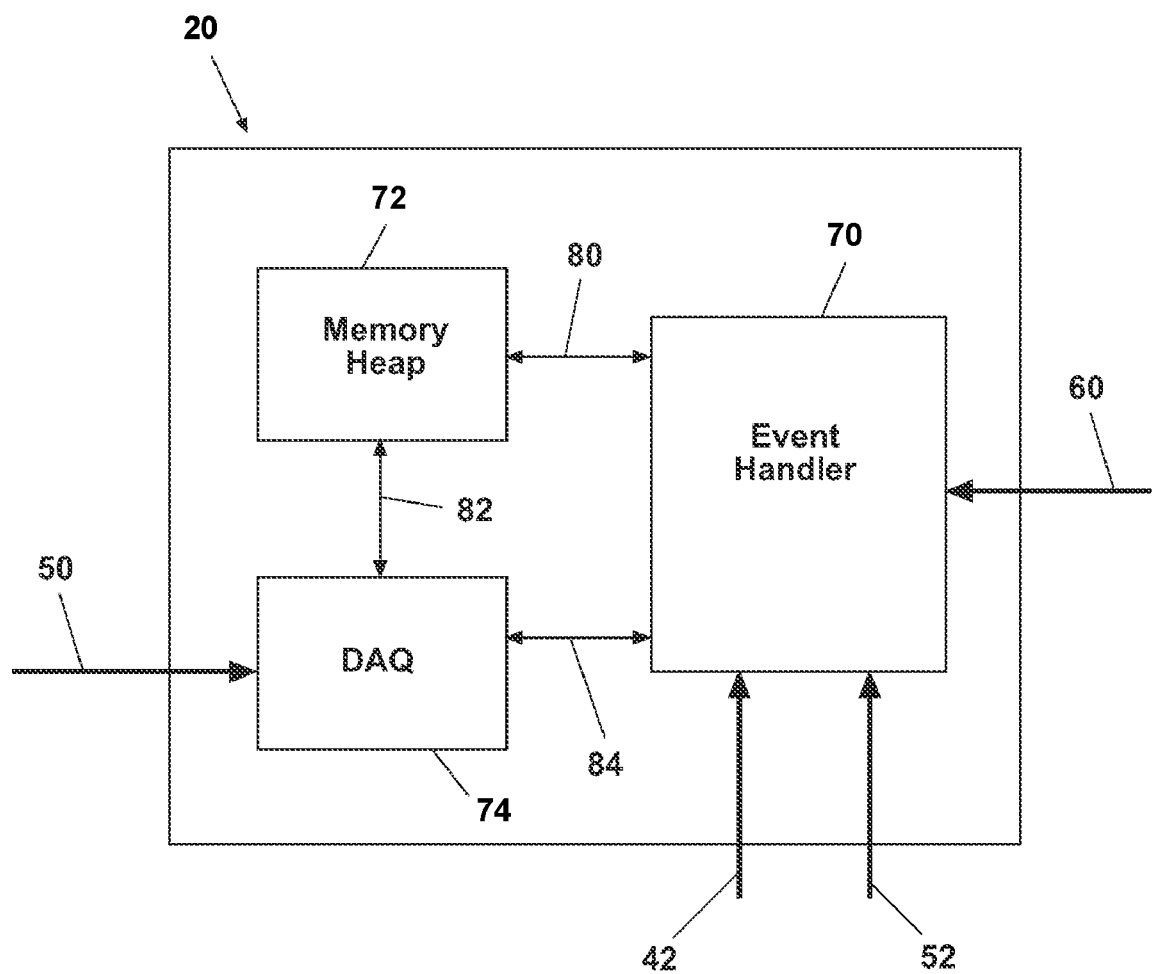
FIG. 2 is a schematic illustration of the eventing engine of FIG. 1.

Referring now to FIG. 2, in order to accomplish event recognition and message sending, the eventing engine 20 comprises an event handler 70, a memory heap 72, and a data acquisition application program interface, referred to herein as a DAQ 74. The event handler 70 sends and receives all messages issuing from and directed to the eventing engine 20. Received messages can include information for configuring the event handler 70 to send event notification messages to certain components. For example, the debug module 30 can send a message via debug event notification bus 52 to the event handler 70 to subscribe to a particular event, which tells the eventing engine that the variable for that event is of interest and should be watched. Such a message would instruct the event handler 70 to send a certain message to the debug module 30 upon the occurrence of an event specified by the message. Similarly, the CPU 12 is capable of subscribing to specific events via CPU event notification bus 42.

The debug module 30 can be configured to subscribe to at least one specific event either by software or hardware within the data processing system 10, or by an external device. An external device can connect to the external bus 18 and send messages through the debug bus 62 to the debug module 30 instructing the debug module 30 to subscribe to certain events. External devices can be user-operated devices, such as a PC. Preferably, the debug module 30 can also subscribe the CPU 12 to a specific event by sending an appropriate message to the event handler 70.

The memory heap 72 comprises a memory in which is stored a plurality of elements corresponding to an array of events configured by the event handler 70 via memory heap access bus 80. Each event is defined in the memory heap 72 by a pointer to the location of an associated variable data value in the memory 16, the current value of the variable data value in the memory 16, an event operator, and an operator argument. In some instances, an event can have multiple operators or arguments. A developer can use several event operators. Examples include: on change, greater than, less than, equal to, deadband filter, bitmask, linking of two or more events through a logical expression, etc. Additional operators could be designed to control the memory heap 72 at runtime, and could function to clear events, add events, turn external notification on/off, get events, get event data, etc. The argument is preferably a numeric value, such as the number "5".

The event handler 70 can examine the memory heap 72 using a memory heap access bus 80 at any time to check for the occurrence of an event. For example, the event handler can iterate over each of the elements of the memory heap 72 or it can inspect a particular element upon a change in the variable data value for that element. In addition, the event handler 70 can send data from the memory heap 72 across event bus 60 to the external bus 18. In this manner, the data stored in the memory heap 72 can be sent to an external device. Preferably, the event bus 60 is used to send data from the memory heap 72 to a PC connected to the external bus 18 for real-time data transfer purposes not associated with debugging. An example of such a purpose would be if the data processing system 10 were connected to an external device in order to operate the external device.

The DAQ 74 monitors the main communication bus 40 via the eventing bus 50 for variable data values of interest and can supply the variable data values to the memory heap 72 and the Event handler 70. The event handler 70 can instruct the DAQ 74 using a DAQ bus 84 to watch the main communication bus 40 for data associated with at least one or more specific events. The DAQ 74 can be configured by the event handler 70 to watch for the occurrence of data associated with a specific variable data value, and the DAQ 74 can selectively store said data in the memory heap 72 using a memory heap storage bus 82. The DAQ 74 does so by comparing the variable data value recognized on the main communication bus 40 to the variable data value stored in the memory heap 72. If the DAQ 74 detects that the variable data value on the main communication bus 40 is different from the variable data value stored in the memory heap 72 for a specific event, the DAQ 74 will store the new variable data value in the memory heap 72 in the array for the associated event. At the same time, the DAQ 74 will send a change signal, which is a signal indicating a variable data value change, to the event handler 70.

When the event handler 70 receives a change signal from the DAQ 74, the event handler 70 will examine the memory heap to determine whether or not an event has occurred. The event handler 70 can examine the memory heap 72 prior to the writing of the changed variable data value to the memory heap 74. In this way, the event handler 70 can use both the value in the memory heap 72 and the changed value to determine if an event has occurred. The event handler 70 accomplishes this by logically checking the associated variable data value against the event operator and argument. When the event conditions evaluate to TRUE, notification messages are generated and broadcast to the debug module 30 and/or the CPU 12, depending on whether or not each component has subscribed to the particular event. These messages can contain data indicative of the specific event, the variable data value detected, and/or any other signals requested by the subscriber. For example, an event might have a "greater than" operator and an argument of 10, and the debug module 30 could be subscribed to the event. The event handler 70 would then logically test the variable data value in the memory heap 72 associated with the event to see if it was greater than 10. If the variable data value is greater than 10, the event handler 70 would send a message to the debug module 30 containing all data associated with event (the pointer, the operator, the argument, and the variable data value).

In addition to looking for events for the event-based program, the eventing engine can be used by the debug module 30 to monitor variable data values in real time and for standard debugging capabilities. The debug module 30 can request that the event handler 70 monitor certain variables and provide their variable data values. The event handler 70 will then send messages whenever any event occurs so that the debug module 30 is able to output real-time variable data values over the debug bus 62 using only minimal bandwidth. This is achieved because variable data values are only output by the eventing engine 70 when they meet the criteria for the desired event. This provides real time data values to the debug module without requiring a complete memory dump. By tracking the variable data values of interest, which is normally a subset of all of the variable data values, and sending changes in those values over a dedicated bus, the eventing engine is able to provide the debug module with real time variable data values while remaining embedded within the hardware of the data processing system 10. This enables real time debugging, which has not currently been available for many processors.

The debug module 30 could also be configured so that certain events would trigger breakpoints, which would halt program execution and enable memory dumps. However, the memory dump bus is not capable of transmitting real-time variable data values to the debug module 30, as that would require an enormous bandwidth not supported by memory dump buses.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention, which is defined in the appended claims.

What is claimed is:

1. A data processing system, comprising:
a central processing unit for executing instructions to implement a program;
a first memory coupled to the central processing unit for storing variable data values generated by the instructions for variables of the program; and
an eventing engine coupled to the central processing unit and to the first memory, comprising a memory heap configured to store an array of events, each event being defined by a plurality of elements including at least an associated variable data address in the first memory, a value of the associated variable data address, and an event operator, wherein the eventing engine can monitor, as the central processing unit executes the instructions in real-time, at least one of the variable data values and determine the occurrence of an event based on the event operator and one of the at least one of the variable data values and an argument of the event operator.

2. The data processing system according to claim 1, and further comprising a first communication bus coupling the central processing unit to the first memory and the eventing engine monitors the at least one of the variable data values on the first communication bus.

3. The data processing system according to claim 2, wherein the eventing engine monitors the first communication bus for a memory write command for the at least one of the variable data values to determine a change in the variable data value.

4. The data processing system according to claim 2, and further comprises a second memory coupled to the eventing engine for storing the at least one of the variable data values.

5. The data processing system according to claim 4, wherein the eventing engine stores the at least one of the variable data values when the central processing unit sends a write command for the at least one of the variable data values on the communication bus.

6. The data processing system according to claim 5, wherein the eventing engine stores an argument for each operator.

7. The data processing system according to claim 6, wherein the eventing engine tests the operator and argument against the at least one of the variable data values to determine if an event has occurred.

8. The data processing system according to claim 1, wherein the at least one of the variable data values is a predetermined variable data value.

9. The data processing system according to claim 8, wherein the predetermined variable data value is a user-selected variable data value.

10. The data processing system according to claim 1, and further comprising an external communication bus coupled to the eventing engine to provide the variable data values externally of the data processing system in real time.

11. The data processing system according to claim 1, wherein the eventing engine monitors multiple variable data values.

12. The data processing system according to claim 1, wherein the eventing engine comprises a data acquisition engine that monitors the data on a communication bus for data related to the at least one of the variable data values.

13. The data processing system according to claim 12, wherein the data acquisition engine determines a change in the at least one variable data values and outputs a change signal.

14. The data processing system according to claim 13, and further comprising an event handling engine coupled to the data acquisition engine to receive the change signal and determine if the change in the at least one of the variable data values is an event and to send out an event signal upon the determination of an event.

15. The data processing system according to claim 14, wherein the event handling engine determines an event by logically testing the at least one variable data values against a predetermined operator and argument.

16. The data processing system according to claim 1 further comprising a debug module coupled to the eventing engine for receiving the at least one of the variable data value in real time and to facilitate debugging the program.

17. The data processing system according to claim 16, wherein the at least one of the variable data values is a predetermined variable data value and the predetermined variable data value is determined by the debug module.

18. The data processing system according to claim 16, and further comprising an external communication bus coupled to the eventing engine to provide the variable data values externally of the data processing system in real time and a second communication bus coupling the first memory to the debug module, wherein the second communication bus is not fast enough to provide the variable data values in real time.

19. The data processing system according to claim 16 wherein the debug module subscribes to the eventing engine for a particular event corresponding to the at least one of the variable data values wherein the eventing engine observes the value of the variable data values in response to the subscription.

20. The data processing system according to claim 16 further comprising a debug bus wherein the debug module outputs real time data values over the debug bus in response to messages from the eventing engine.

21. The data processing system according to claim 1 wherein the eventing engine is configurable at runtime by a network API, including at least one of functions to clear events, add events, turn external notification on/off, get events, and get event data.

* * * * *